May 18, 1926.  
R. J. FEJA  
1,585,336  
GRIPPING ATTACHMENT FOR TIRES  
Filed August 11, 1924  2 Sheets-Sheet 1

Witnesses:

Inventor:
Robert J. Feja

His Attorney.

May 18, 1926.

R. J. FEJA 1,585,336

GRIPPING ATTACHMENT FOR TIRES

Filed August 11, 1924  2 Sheets-Sheet 2

Witnesses:

Inventor:
Robert J. Feja
By Joshua R. H. Potk
His Attorney

Patented May 18, 1926.

1,585,336

UNITED STATES PATENT OFFICE.

ROBERT J. FEJA, OF CHICAGO, ILLINOIS.

GRIPPING ATTACHMENT FOR TIRES.

Application filed August 11, 1924. Serial No. 731,323.

My invention relates to new and useful improvements in a gripping attachment for tires, more particularly for pneumatic tires for motor vehicles; and the invention has for its paramount object a provision of an improved construction of this character which will be highly efficient in use.

Among other objects my invention has in view the provision of a gripping attachment of the class specified, especially designed as a ground gripping device for use in supplying purchase for the traction effort on soft and moist earth, in climbing steep or relatively steep grades, there being also in view in this connection the provision of a device which may be quickly and conveniently applied to and as well removed from, the vehicle wheel, and when removed from the wheel requires but little space in which to be stored. A further object is the provision of an attachment involving features of adjustment to compensate for differences in the dimensions of the wheels, and also involving certain simple features of interchangeability under which ground gripping elements of different characters, suitable for different road and weather conditions, may be employed at will.

Other objects will appear hereinafter.

The invention consists in the combinations and arrangements of parts hereinafter described and claimed.

The invention will be best understood by reference to the accompanying drawings forming a part of this specification, and in which, Fig. 1 represents a motor vehicle wheel, fractionally shown, equipped with my improved attachment;

Figure 1:
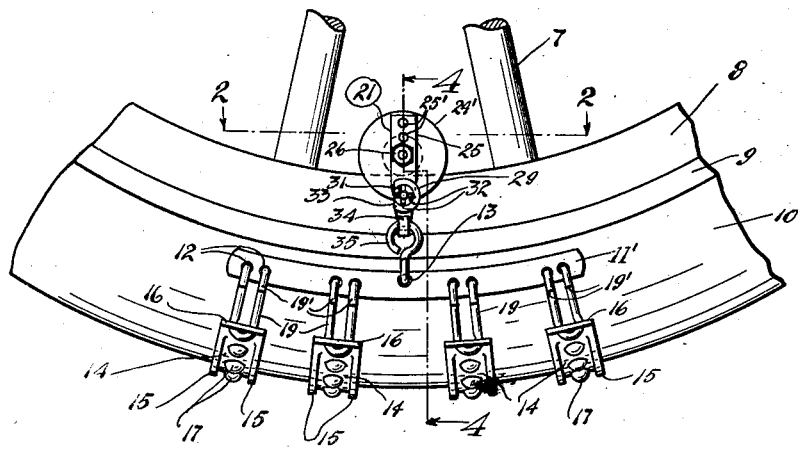
Figure 2:
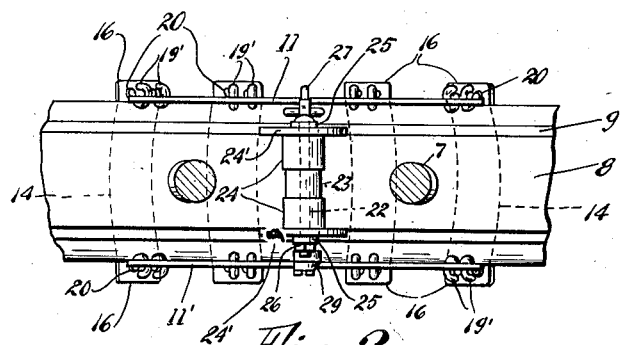
Fig. 2 represents a sectional view taken on the line 2—2 of Fig. 1 and looking in the direction of the arrows.
Figure 3:
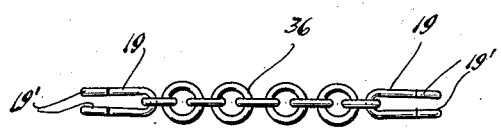
Fig. 3 illustrates a type of chain grip which may be connected between the tire engaging plates.

For the purpose of illustrating the application of my invention, I have shown in the accompanying drawing a fragmentary portion of a vehicle wheel including spokes 7, a felly ring 8, a rim 9 and a pneumatic tire 10.

For the purpose of carrying out my invention, I employ a pair of complementary tire engaging side members 11 and 11' of arcuate form designed to be located along the opposite sides of the tire 10 at points distant from the rim 9. Each of these side members is made with spaced-apart pairs of hook receiving apertures 12; and midway of its length each of them is provided with an aperture 13 for the reception of the means for securing or strapping it to the vehicle wheel. 14 represents ground gripping plates of arcuate form designed to fit upon the tread of the tire 10 transversely thereof. Each of the ground gripping plates 14 has each of its longitudinal edges bent outwardly to provide flanges 15 and has its opposite extremities bent outwardly to form lugs 16. Between the flanges 15 the ground gripping plates are formed with a series of outward deformations or ground gripping studs 17, the points coming directly opposite the tread of the tire 10. The flanges 15 are preferably formed with arcuate cavities or recesses 18 for the purpose of adding further gripping features to the same. Each of the ground gripping plates is connected with the side members 11 and 11' by means of U-shaped links 19 formed with hook-shaped extremities 19'. The U-shaped links are preferably made from lengths of steel rods. In connecting the plates 14 to and between the side members 11 and 11', the hook ends 19' are first passed through apertures 20 provided in the lugs 16, and then are passed through the apertures 12 of the side members, as clearly shown in the drawings, it being noted that the hook-shaped ends 19' are so passed through the side plates that their extremities lie on the outer sides thereof. The ground gripping plates 14 thus swung from the side members 11 and 11' are free to spread radially across the pneumatic tire 10.

Figure 4:
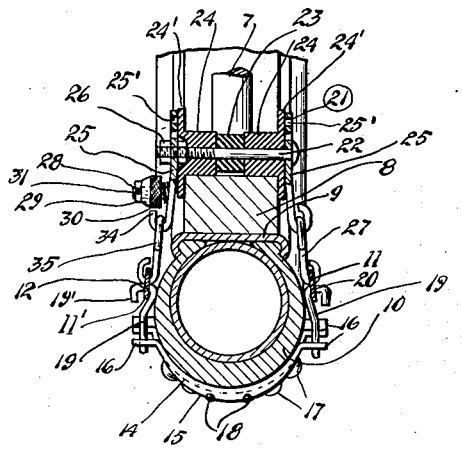
Fig. 4 is a cross section taken substantially on the line 4—4 of Fig. 1.

Referring to Fig. 4, it will be seen that for the purpose of supporting the ground gripping device upon the pneumatic tire, I employ a strapping device referred to generally by the numeral 21 and consisting of a bolt 22 on which is mounted a central rubber ring 23 which is flanked by rubber cylindrical elements 24 formed with flanges 24' designed to engage over the opposite sides of the felly ring 8. The flanges 24' abut on side adjustment plates 25 which have a series of spaced apertures 25', adapted to afford a choice of positions for the bolt 22. threaded for the reception of the securing nut 26. By means of this construction, the strapping device is adjustable transversely of the felly ring and it is also adjustable radially of the wheel; these provisions being made in order that the device may be applied to felly rings or rims of different dimensions and further in order that the ground gripping structure may be adjustably applied to tires of different sizes.

One of the side plates 25 is connected by means of a link 27 to one of the side members herein shown to be the side member 11, the said link being passed through the aperture 13 of the side member as shown. With the other member 25 is associated a latching device by means of which the ground gripping attachment is detachably connected with the strapping device 21. This fastening device includes a pin 28 which projects outwardly from the member 25 and on which is mounted for rotary movement a securing body 29. A push spring 30 is mounted about the pin 28 between the plate 25 and the securing body 29 for the purpose of normally urging the securing body 29 outwardly upon the pin, its outward movement being, however, limited by a stop pin 31 attached to the outer end of the pin 28 transversely thereof. The outer end of the securing body 29 is provided with slots 32 designed to receive the cross pin 31. The securing body 29, as best shown in Fig. 1, is of cylindrical form but has a flat face or side 33. This entire arrangement is such that the curved periphery of the securing body 29 comes so close to the hooked end 34 formed on the plate 25 that a connecting link member 35 is not removable therefrom, the lower end of said link member 35 being engaged in the aperture 13 of the tire engaging side member 11'. When however the securing body 29 is turned upon its pin into such position that the flat face 33 thereof confronts the hooked end 34, the upper end of the link member 35 may be removed from said hooked end 34. In this manner I provide a novel fastening device which allows a quick and convenient application and coupling up of my improved gripping attachment. This same feature also it will be observed provides a quick and convenient removal of the attachment when desired.

When the gripping attachment has been removed from the vehicle wheel the ground gripping plates 14 with their connecting links 19 may be readily disconnected from the side plates 11 and 11'. The purpose of this arrangement is to permit ground gripping devices of character other than the plates 14 to be connected up between the side plates 11 and 11'. For instance, the ground gripping plates 14 are of relatively heavy construction, being intended primarily to serve as elements for use in connection with soft and moist earth or in connection with relatively steep grades. Where gripping elements of anti-skid character only are needed, I connect between the U-shaped links 19 and anti-skid chain 36, in place of the ground gripping plates 14. The links 19 are then connected with the side plates 11 and 11' as before.

Figure 6:
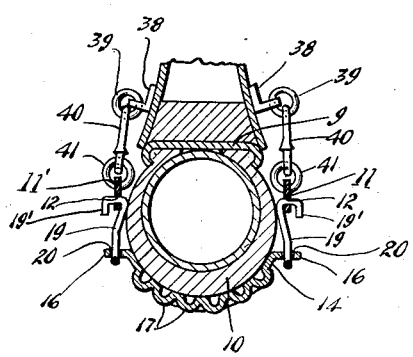
Fig. 6 shows a section taken substantially on the line 6—6 of Fig. 5.
Figure 5:
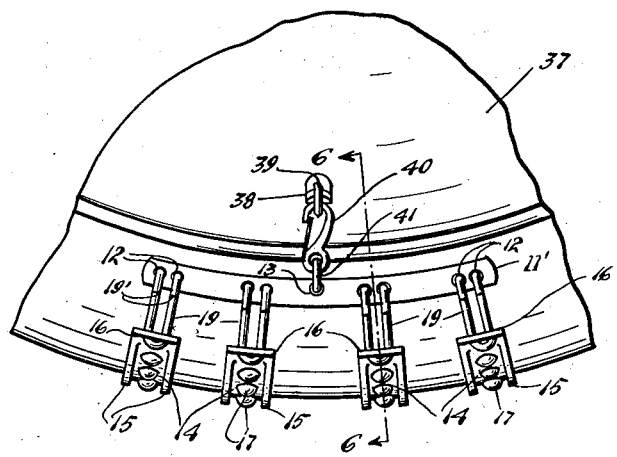
Fig. 5 shows my gripping attachment as applied to a disc wheel.

In Figs. 5 and 6 I illustrate how my improved gripping attachment may be employed in connection with a disc wheel 37. To each side of the disc wheel at points above the rim 9 is attached an anchor-bracket 38 of angular form as shown. These brackets are preferably secured to the wheel by welding them thereon. Each of the brackets carries a ring link 39 with which is engageable a snapper element 40, carried by a ring link 41 which is engaged with a side plate. Thus in Fig. 6 it will be seen that on opposite sides of the tire 10, the side plates 11 and 11' are respectively connected with the anchor-brackets 38 by means of ring links 41 and snappers 40.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent is:

An attachment of the character set forth including a pair of rigid tire engaging side members; there being spaced pairs of apertures transversely through said side members; ground grips adapted to cross the face of a tire and provided with terminal apertures; rod members bent into U-shaped links and linked loosely through said terminal apertures; and open hooks on the extremities of the U-shaped links detachably hooked through the pairs of apertures of the rigid side members.

In testimony whereof I have signed my name to this specification.

ROBERT J. FEJA.